US011915567B2

(12) United States Patent
Hewett

(10) Patent No.: US 11,915,567 B2
(45) Date of Patent: Feb. 27, 2024

(54) SYSTEMS AND METHODS FOR RFID-BASED RETAIL MANAGEMENT

(71) Applicant: Automaton, Inc., San Diego, CA (US)

(72) Inventor: Spencer Hewett, New York, NY (US)

(73) Assignee: Automaton, Inc., San Diego, CA (US)

( * ) Notice: Subject to any disclaimer, the term of this patent is extended or adjusted under 35 U.S.C. 154(b) by 147 days.

(21) Appl. No.: 17/346,775

(22) Filed: Jun. 14, 2021

(65) Prior Publication Data

US 2021/0304576 A1 Sep. 30, 2021

Related U.S. Application Data

(63) Continuation of application No. 15/995,400, filed on Jun. 1, 2018, now Pat. No. 11,043,093, which is a continuation of application No. 14/598,615, filed on Jan. 16, 2015, now Pat. No. 10,013,860.

(60) Provisional application No. 61/928,303, filed on Jan. 16, 2014.

(51) Int. Cl.
*G08B 13/24* (2006.01)

(52) U.S. Cl.
CPC ..... *G08B 13/2428* (2013.01); *G08B 13/2451* (2013.01)

(58) Field of Classification Search
CPC ........................ G08B 13/2428; G08B 13/2451
See application file for complete search history.

(56) References Cited

U.S. PATENT DOCUMENTS 5,267,334 A 11/1993 Normille et al.
6,891,469 B2 5/2005 Engellenner
7,327,383 B2 2/2008 Valleriano et al.
7,436,306 B2 10/2008 Berger et al.
7,436,309 B2 10/2008 Koele
7,520,424 B2 4/2009 Haberler
7,652,576 B1 1/2010 Crossno et al.
7,667,652 B2 2/2010 Gevargiz et al.
7,760,095 B2 7/2010 Murrah
8,094,026 B1 1/2012 Green
8,184,154 B2 5/2012 Estevez et al.
8,350,675 B2 1/2013 Riechel
8,441,354 B2 5/2013 Padmanabhan et al.
8,847,739 B2 9/2014 Wilson et al.

(Continued)

FOREIGN PATENT DOCUMENTS

DE 102004025663 A1 12/2005
DE 102004055931 A1 6/2006

(Continued)

OTHER PUBLICATIONS

Al-Kassab et al.,"RFID-enabled business process intelligence in retail stores: a case report." Journal of theoretical and applied electronic commerce research 8, No. 2 (2013): 112-137.

(Continued)

*Primary Examiner* — Quan Zhen Wang
*Assistant Examiner* — Rajsheed O Black-Childress
(74) *Attorney, Agent, or Firm* — Smith Baluch LLP

(57) ABSTRACT

A system for RFID-based retail management that includes a set of antennas, an RFID transceiver connected to the set of antennas; and a microprocessor-based system manager that controls the RFID transceiver and transforms RFID response data from the RFID transceiver into RFID tag location data according to read probability methods.

16 Claims, 11 Drawing Sheets

(56) References Cited

U.S. PATENT DOCUMENTS

| | | | |
|---|---|---|---|
| 9,036,028 B2 | 5/2015 | Buehler | |
| 9,111,156 B2 | 8/2015 | Sadr et al. | |
| 9,183,717 B1 | 11/2015 | Diorio et al. | |
| 9,311,799 B2 | 4/2016 | Jain et al. | |
| 9,652,912 B2 | 5/2017 | Fadell et al. | |
| 9,664,510 B2 | 5/2017 | Nathan et al. | |
| 10,013,860 B2 | 7/2018 | Hewett | |
| 10,386,474 B2 | 8/2019 | Hewett | |
| 10,871,558 B2 | 12/2020 | Hewett | |
| 11,043,093 B2 | 6/2021 | Hewett | |
| 11,215,691 B2 | 1/2022 | Hewett et al. | |
| 11,408,965 B2 | 8/2022 | Hewett et al. | |
| 11,543,512 B2 | 1/2023 | Hewett | |
| 2001/0049636 A1 | 12/2001 | Hudda et al. | |
| 2004/0143505 A1 | 7/2004 | Kovach | |
| 2004/0169587 A1 | 9/2004 | Washington | |
| 2004/0228503 A1 | 11/2004 | Cutler | |
| 2005/0008199 A1 | 1/2005 | Dong et al. | |
| 2005/0185544 A1 | 8/2005 | Berger | |
| 2005/0206555 A1 | 9/2005 | Bridgelall et al. | |
| 2005/0242926 A1 | 11/2005 | Berger | |
| 2005/0263592 A1 | 12/2005 | Berger et al. | |
| 2006/0027646 A1 | 2/2006 | Haberler | |
| 2006/0177291 A1 | 8/2006 | Kienzi et al. | |
| 2006/0187053 A1 | 8/2006 | Koele | |
| 2006/0206704 A1 | 9/2006 | Gauby et al. | |
| 2007/0001808 A1 | 1/2007 | Kastelic et al. | |
| 2007/0073513 A1 | 3/2007 | Posamentier | |
| 2007/0235527 A1 | 10/2007 | Appleyard et al. | |
| 2008/0143482 A1 | 6/2008 | Shoarinejad et al. | |
| 2008/0157972 A1* | 7/2008 | Duron | G01S 13/46 340/572.1 |
| 2008/0243626 A1 | 10/2008 | Stawar et al. | |
| 2009/0012704 A1 | 1/2009 | Franco et al. | |
| 2009/0271251 A1 | 10/2009 | Sorensen et al. | |
| 2009/0322489 A1 | 12/2009 | Jones et al. | |
| 2010/0001842 A1 | 1/2010 | Duron et al. | |
| 2010/0039228 A1 | 2/2010 | Sadr et al. | |
| 2010/0045436 A1 | 2/2010 | Rinkes | |
| 2010/0148985 A1 | 6/2010 | Lin et al. | |
| 2010/0156651 A1 | 6/2010 | Broer | |
| 2010/0201520 A1 | 8/2010 | Stern et al. | |
| 2010/0287057 A1 | 11/2010 | Aihara et al. | |
| 2011/0071921 A1 | 3/2011 | Crespo et al. | |
| 2011/0134240 A1 | 6/2011 | Anderson et al. | |
| 2011/0145093 A1 | 6/2011 | Paradise et al. | |
| 2011/0199211 A1 | 8/2011 | Campero et al. | |
| 2011/0320322 A1 | 12/2011 | Roslak et al. | |
| 2012/0094683 A1 | 4/2012 | Yoell | |
| 2013/0154802 A1 | 6/2013 | O'Haire et al. | |
| 2013/0201003 A1 | 8/2013 | Sabesan et al. | |
| 2014/0159869 A1 | 6/2014 | Zumsteg et al. | |
| 2014/0361078 A1 | 12/2014 | Davidson | |
| 2015/0039458 A1 | 2/2015 | Reid | |
| 2021/0199747 A1 | 7/2021 | Hewett et al. | |
| 2021/0199748 A1 | 7/2021 | Hewett et al. | |
| 2021/0304576 A1 | 9/2021 | Hewett | |
| 2022/0082651 A1 | 3/2022 | Hewett et al. | |
| 2023/0130857 A1 | 4/2023 | Hewett | |

FOREIGN PATENT DOCUMENTS

| | | | | |
|---|---|---|---|---|
| DE | 102006007776 A1 | 8/2007 | | |
| DE | 102008063981 A1 | 5/2010 | | |
| DE | 102009016557 A1 | 10/2010 | | |
| EP | 1573645 A1 | 9/2005 | | |
| EP | 1658575 A1 | 5/2006 | | |
| EP | 1821236 A2 | 8/2007 | | |
| EP | 1658575 B1 | 12/2007 | | |
| EP | 1821236 A3 | 8/2008 | | |
| EP | 2239683 A1 | 10/2010 | | |
| EP | 2239683 81 | 7/2013 | | |
| KR | 1020060010683 A | 2/2006 | | |
| WO | 2005024703 A1 | 3/2005 | | |
| WO | WO-2013126391 A1 * | 8/2013 | | G06K 7/10356 |
| WO | 2014146132 A3 | 10/2014 | | |
| WO | 2022226351 A2 | 10/2022 | | |
| WO | 2022226410 A1 | 10/2022 | | |
| WO | 2023278652 A1 | 1/2023 | | |

OTHER PUBLICATIONS

Aryal, "Integrating Camera Recognition and RFID System for Assets Tracking And Warehouse Management." (2012). 41 pages.
Baraniuk et al., "Model-based compressive sensing." IEEE Transactions on Information Theory, 56, No. 4 (2010): 1982-2001.
Dardari et al., "Ultrawide bandwidth RFID: The next generation ?. " Proceedings of the IEEE 98, No. 9 (2010):1570-1582.
Donoho, "Compressed sensing." IEEE Transactions on Information Theory, vol. 52, No. 4 (2006): 1289-1306.
Ettus Research Universal Software Radio Peripheral. Accessed at http://ettus.com on Sep. 9, 2019, 4 pages.
Fossorier et al., "Reduced complexity iterative decoding of low-density parity check codes based on belief propagation." IEEE Transactions on Communications, vol. 47, No. 5 (1999): 673-680.
Indyk, Tutorial on Compressed Sensing (or Compressive Sampling, or Linear Sketching). Princeton 2008. Available at http://people.csail.mit.edu/indyk/princeton.pdf, 15 pages.
IntelliVision—AI and Video Analytics for Smart Cameras. Accessed at https://www.intelli-vision.com/ on Sep. 4, 2019. 7 pages.
International Search Report and Written Opinion, PCT/US2018/024950, 20 pages (dated Aug. 1, 2018).
International Search Report dated Apr. 5, 2016 in international Application No. PCT/US2015/057206, 13 pages.
International Search Report dated Mar. 15, 2013 in international Application No. PCT/US2012/060123, 12 pages.
Lee et al., "An enhanced dynamic framed slotted ALOHA algorithm for RFID tag identification." The Second Annual International Conference on Mobile and Ubiquitous Systems: Networking and Services. IEEE, 2005, 7 pages.
Li et al., "IDCam: Precise Item Identification for AR Enhanced Object Interactions." 2019 IEEE International Conference on RFID (RFID). IEEE, 2019. 7 pages.
Mceliece et al., "Turbo decoding as an instance of Pearl's belief propagation algorithm." IEEE Journal on Selected Areas in Communications, vol. 16, No. 2 (1998): 140-152.
Mojix Technology Breakthrouhs. Mojix Inc Oct. 23, 2015. Accessed at http://www.mojix.com/learn_the_difference/technology.php, 4 pages.
Palanki, et al., "Rateless codes on noisy channels." In IEEE International Symposium on Information Theory, pp. 37-37. 2004.
Ramakrishnan et al., "Performance benchmarks for passive UHF RFID tags." MMB 2006 (2006). , 100 pages.
Raman et al., "Execution: The missing link in retail operations." California Management Review 43.3 (2001): 136-152.
Retailer Boosts Sales 14%, Cuts Inventory Management Costs 35% with RFID Solution. Microsoft Customer Solution Retail Industry Case Study. Sep. 2009. Available at http://download.microsoft.com/download/5/4/1/541AF3C9-BD73-4A91-BF7C-ACE0DBF78235/XterpriseAmericanApparelCaseStudy.pdf, 6 pages.
RFID essentials. O'Reilly Media, Inc. Bill Glover, Himanshu Bhatt, 2006 ISBN 0-596-00944-5, pp. 88-89. 4 Pages (including front matter).
Roberti, RFID Delivers Unexpected Benefits at American Apparel. RFID Journal Oct. 5, 2011, 2 pages.
Shih et al. "Taxonomy and survey of RFID anti-collision protocols." Computer Communications 29, No. 11 (2006): 2150-2166.
Vaswani, "LS-CS-residual (LS-CS): compressive sensing on least squares residual." IEEE Transactions on Signal Processing, vol. 58, No. 8 (2010): 4108-4120.
Wang et al., "Efficient and reliable low-power backscatter networks." ACM SIGCOMM Computer Communication Review 42, No. 4 (2012): 61-72.
Weiss et al., "On the optimality of solutions of the max-product bellef-propagation algorithm in arbitrary graphs." IEEE Transactions on Information Theory, vol. 47, No. 2 (2001): 736-744.

(56) References Cited

OTHER PUBLICATIONS

Zhang et al., A batteryless computational RFID and sensing platform. Tech Report UMASS, 2011. Accessed at http:// spqr.cs.umass.edu/moo/. 4 pages.

Zhuang et al., "Adaptive key frame extraction using unsupervised clustering." In Image Processing, 1998. ICIP 98. Proceedings. vol. 1, pp. 866-870. IEEE, 1998.

* cited by examiner

PRIOR ART

Step 1

Step 2

RSSI-1→d1 RSSI-2→d2 RSSI-3→d3 d1,d2,d3 + antenna loc.→ tag loc.

Step 3

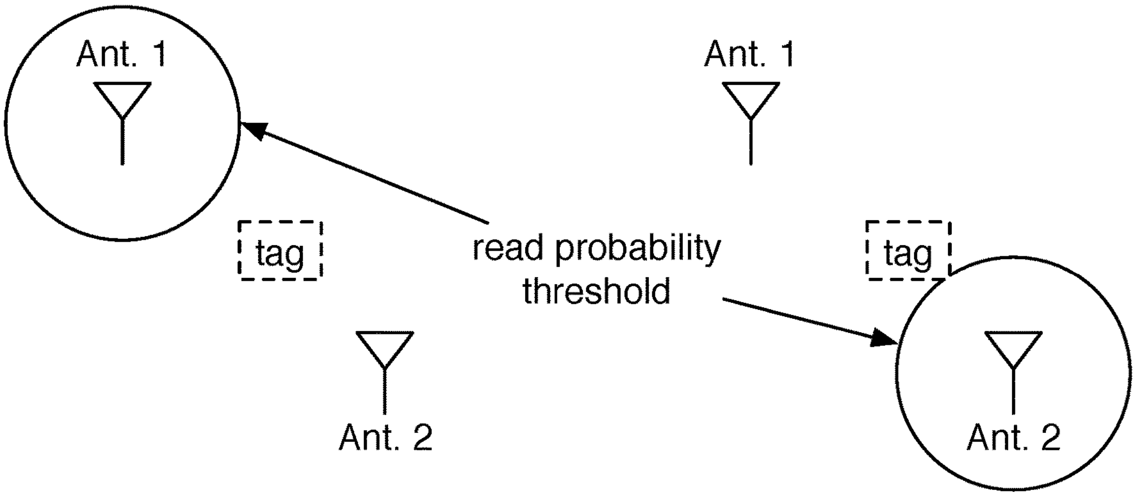
FIGURE 3A
FIGURE 3B
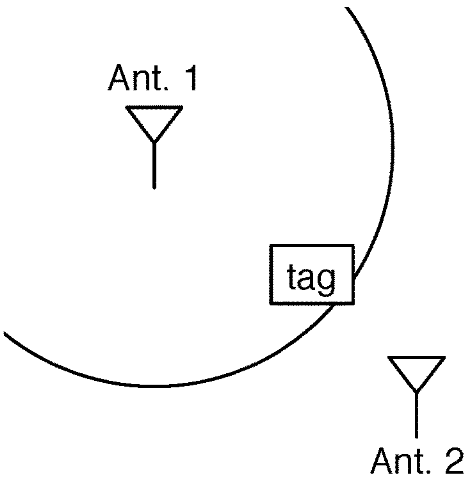
FIGURE 3C
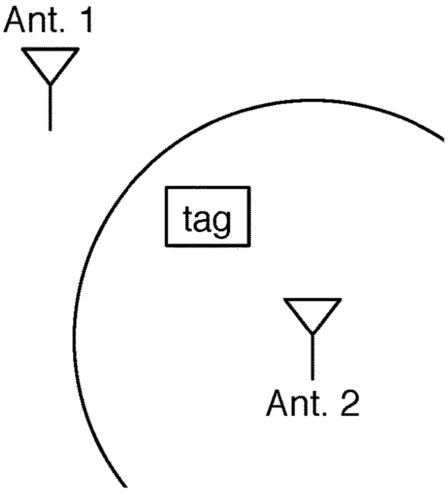
FIGURE 3D

SYSTEMS AND METHODS FOR RFID-BASED RETAIL MANAGEMENT

CROSS-REFERENCE TO RELATED APPLICATIONS

This application is a continuation of U.S. application Ser. No. 15/995,400, filed Jun. 1, 2018, which is a continuation of U.S. application Ser. No. 14/598,615, filed Jan. 16, 2015, which in turn claims the benefit, under 35 U.S.C. 119(e), of U.S. Provisional Application No. 61/928,303, filed on Jan. 16, 2014. Each of these applications is incorporated herein by reference in its entirety.

TECHNICAL FIELD

This invention relates generally to the retail shopping field, and more specifically to new and useful systems and methods for RFID-based retail management in the retail shopping field.

BACKGROUND

Modern retail stores suffer from a number of issues that negatively affect consumer experience, and oftentimes, revenue as well. Many stores are forced to spend substantial expense on cashier labor or risk frustrating consumers with long checkout lines. Likewise, expense must also be spared to monitor in-store inventory and provide assistance for consumers looking to find, order, or return specific products. Additionally, theft of products from store shelves continues to be a significant problem for merchants. Existing store monitoring systems rely on various mirrors, cameras or even in-person monitoring of the store floors. These systems are often inadequate to cost-effectively safeguard store inventory.

Existing store security systems also rely on large security devices attached to certain products. These security devices typically rely on magnetic fields, which detect the tag as it passes through a detector located at the exit to a store. These tags must be removed by store personnel prior to exiting the store, which further adds to delays in the checkout process.

Many of these issues could be addressed with systems and methods that allow customers to quickly and easily locate, select, pay for, and remove products from a store. It would further be desirable to have system in place to efficiently monitor store inventory and track it as it progresses through the store, to detect and deter theft, without interfering with legitimate customers' ability to quickly purchase products. Thus, there is a need in the retail shopping field to create new and useful systems and methods for RFID-based retail management.

BRIEF DESCRIPTION OF THE FIGURES

FIGS. 3A, 3B, 3C, and 3D are example representations of read probability measurements;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for RFID-Based Retail Management

Figure 1:
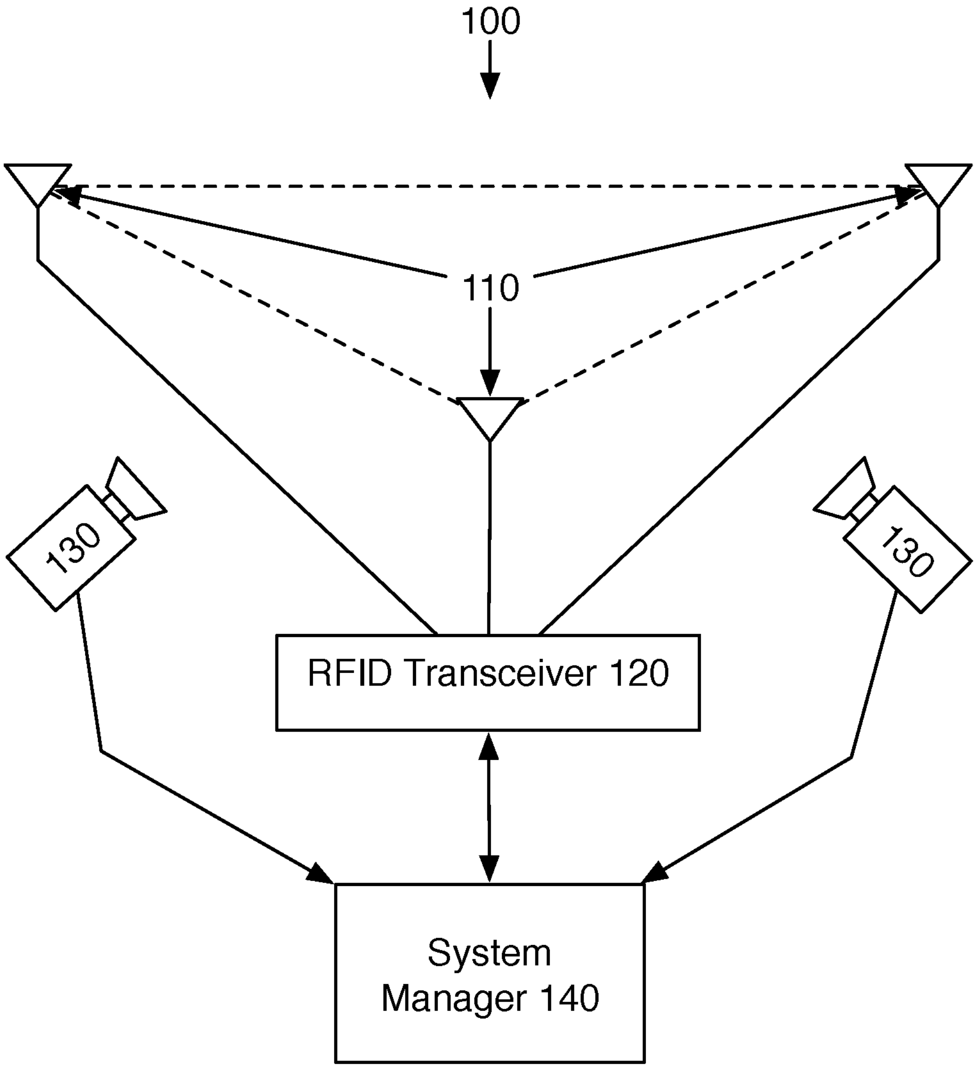
FIG. 1 is a diagram representation of a system of a preferred embodiment.

As shown in FIG. 1, a system 100 for radio-frequency-identification-based (RFID-based) retail management includes a plurality of antennas 110, an RFID transceiver 120, and a system manager 140. The system 100 preferably also includes a camera 130.

The system 100 functions to enable comprehensive inventory management in a retail environment by providing precise locations for individual items throughout a retail environment. The system 100 preferably also tracks individuals, allowing not only for high-efficiency, low-cost security, but also for automated check-out: If a known user picks up an object and walks out of the store, the price of the object can be automatically debited from the user's account, eliminating the user's need to stand in line and check out traditionally.

The system 100 preferably tracks the location of objects in the store using RFID tracking. Each object to be tracked preferably contains an RFID tag; the objects can then be located by finding the location of the associated RFID tag. The system 100 preferably also tracks individuals using RFID tracking: customers in a retail environment preferably carry an RFID tag (e.g., as a card placed in a wallet) that identifies them to the retail environment (and may be linked to payment information, identification information, etc.). The system 100 may additionally or alternatively track objects and/or individuals using visual tracking; computer vision techniques may be used to locate objects or individuals either in conjunction with or independent of RFID tracking techniques.

RFID Tracking

The system 100 functions to locate RFID tags within a three-dimensional volume of interest (or a two-dimensional plane of interest). The system 100 preferably determines tag location across time in order to track changes in tag location and/or tag movement. The system 100 is preferably designed and used to locate UHF passive RFID tags, but may additionally or alternatively be designed and used to locate passive RFID tags operating on any frequency spectrum. Additionally or alternatively, the system 100 may also be used with active RFID tags or any other suitable devices capable of responding selectively based on received RF signal power.

Traditional RFID tag locating systems use one of several methods for tag location, including time difference of arrival (TDOA), phase difference of arrival (PDOA), and RSSI measurement. All three of these methods locate tags using trilateration.

In the case of TDOA, a signal is sent to an RFID tag from one of three antennas. The tag receives the signal and transmits a signal in response. The response signal is then received at all three of the antennas at different times. The time between original signal transmission and reception of the response signal at each antenna can be used to determine the distance from the tag to each antenna, which can then be used to locate the RFID tag (relative to the antennas) using trilateration. The TDOA method is not typically used for UHF RFID tags simply because typical time differences are very small (and bandwidth available is narrow).

There are several types of PDOA, including frequency domain PDOA (FD-PDOA). In FD-PDOA, a signal is sent to a tag from one of three antennas at a first frequency; the tag responds with a first response signal. Then the same antenna sends a signal at a second frequency (preferably close to the first frequency), and the tag responds with a second response signal. The phase difference between the first response signal and the second response signal (as measured at the first antenna) can give a distance from the tag to the first antenna. This process can be repeated for the other two antennas, producing three distances, which can be used to locate the tag using trilateration.

Figure 2:
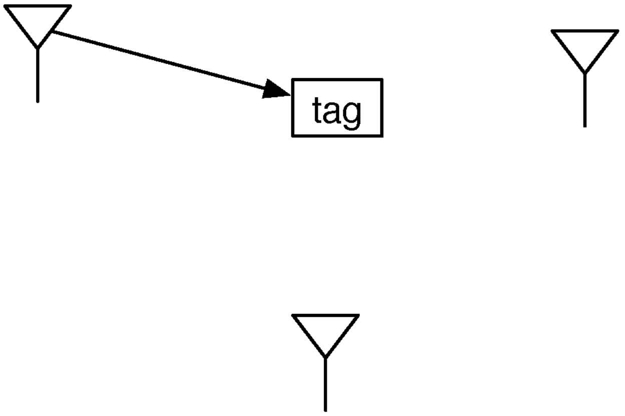
FIG. 2 is a diagram view of a prior-art RSSI locating technique.
Figure 2:
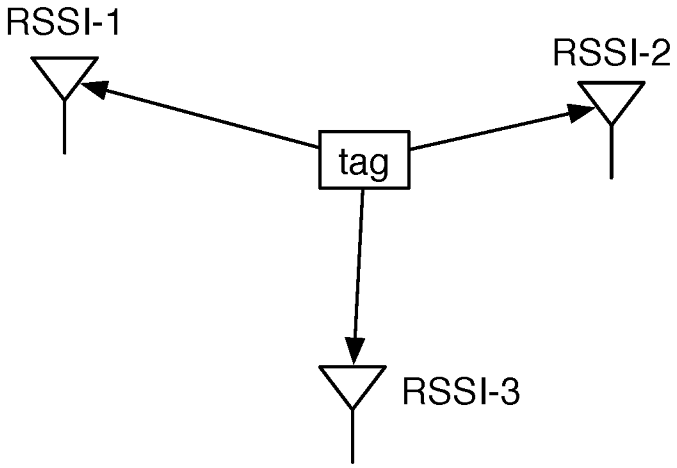

In the case of RSSI measurement, as shown in FIG. 2, a signal is sent to an RFID tag from one (or more) of three antennas. The tag receives the signal and transmits a signal in response. The response signal is then received at all three of the antennas, each recording a different received signal strength (e.g., RSSI). The RSSI is used to estimate distance from each antenna, which can then be used to locate the tag relative to the antennas using trilateration. Since RSSI does not typically correspond well to distance, this method may suffer from accuracy issues.

The system 100 preferably uses an alternative to TDOA, PDOA, and RSSI-based tracking, henceforth referred to as read probability measurement (described in more detail in the description of the method 200). To briefly summarize, read probability measurement takes advantage of RFID tag power-on thresholds (that is, the minimum amount of power a passive RFID tag must receive in order to transmit a readable response signal). The antennas modulate transmission power and record whether the tag responds or not at each transmission power. A number of these transmissions are used together to calculate a read probability (the probability that a tag will be read versus transmission power). By comparing this to an estimate or analysis of how read probability changes with distance (and potentially direction) for each transmission power, a distance from each antenna can be determined, and trilateration can be performed. Read probability may additionally be dependent on the number of time slots available for RFID response; this is because in cases of higher time slot occupation (e.g., 90% of time slots occupied vs. 30%), tag collisions are more probable, and RFID responses may not be recognized.

Figure 4:
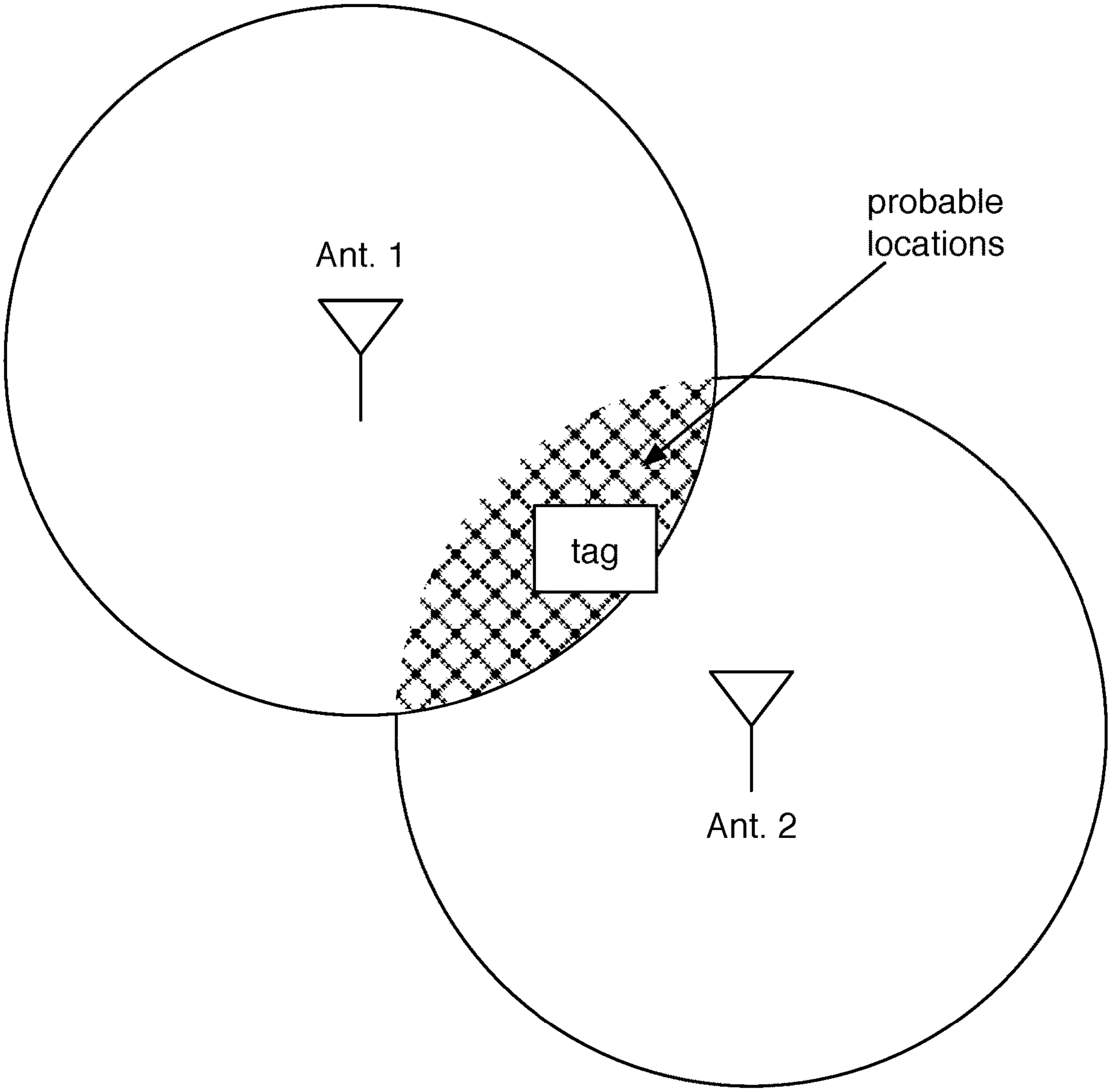
FIG. 4 is an example representation of probable locations identified by read probability measurements.

An example of how read probability measurement can be used for localization is as shown in FIG. 3. In FIG. 3A, Antenna 1's low power pulse (which may activate tags only a short range from Antenna 1) fails to trigger a response from the RFID tag. As shown in FIG. 3B, Antenna 2 then emits a low power pulse, which also fails to activate the RFID tag. As shown in FIG. 3C, Antenna 1 now emits a higher power pulse, which successfully triggers a response from the RFID tag. As shown in FIG. 3D, Antenna 2'S higher power pulse also triggers a response from the RFID tag. From the power levels (and expected ranges) of the signals transmitted by the antennas, the location of the tag can be localized to the intersection of the above-threshold power areas of Antenna 1 and Antenna 2, as shown in FIG. 4. This process can be extended to three or more antennas to enable location via trilateration.

Figure 5:
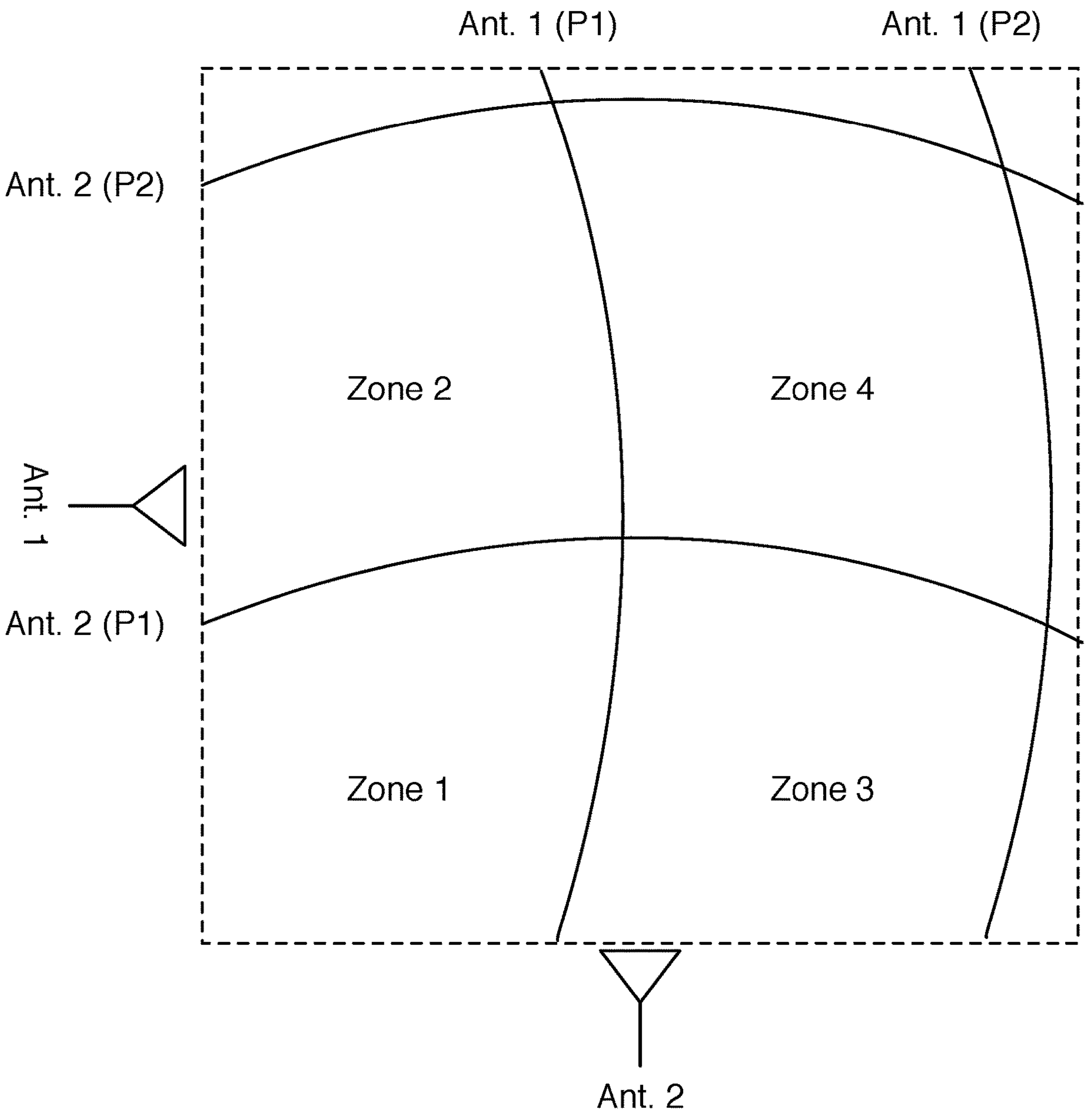
FIG. 5 is an example representation of localization zones defined by read probability thresholds.

At lower resolutions, read probability measurement may be used to localize RFID tags into zones that partition tags in a known area. For example, as shown in FIG. 5, if all RFID tags of interest are within a known area, the area may be partitioned into four zones by the two antennas transmitting at a lower power (P1) and a higher power (P2). Tags in Zone 1 are activated by P1 and P2 transmissions from either Antenna 1 or Antenna 2; tags in Zone 2 are activated by P1 and P2 transmissions from Antenna 1, but only by P2 transmissions from Antenna 2; tags in Zone 3 are activated by P1 and P2 transmissions from Antenna 2, but only by P2 transmissions from Antenna 1; and tags in Zone 4 are activated by only P2 transmissions from either Antenna 1 or Antenna 2.

The system 100 preferably uses read probability measurement independently of other methods of RFID tag locating, but may additionally or alternatively use read probability measurement in conjunction with those methods.

The antennas 110 function enable the system 100 to transmit signals to RFID tags and receive signals from the RFID tags. The antennas 110 convert conducted electric power into RF waves and/or vice versa, enabling the transmission and/or reception of RF communication. The antennas 110 are preferably made out of a conductive material (e.g., metal). The antennas 110 may additionally or alternatively include dielectric materials to modify the properties of the antennas 110 or to provide mechanical support.

The antennas 110 may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The plurality of antennas 110 can additionally include one or more type of antennas, and the types of antennas can include any suitable variations.

The antenna 110 structure may be static or dynamic (e.g., a wire antenna that includes multiple sections that may be electrically connected or isolated depending on the state of the antenna).

Antennas 110 may have isotropic or anisotropic radiation patterns (i.e., the antennas may be directional). If antennas 110 are directional, their radiation pattern may be dynamically alterable; for example, an antenna 110 substantially emitting radiation in one direction may be rotated so as to change the direction of radiation.

The plurality of antennas 110 are preferably connected directly to RFID transceivers 120 with conductive wires, but may additionally or alternatively be connected to transceivers through any suitable method. The antennas 110 may be connected directly to RFID transceivers 120, or may be connected to RFID transceivers 120 through one or more antenna splitters.

The system 100 preferably includes at least three antennas no, so as to be able to perform trilateration, but the system may additionally include any suitable number of antennas. In one implementation of the system 100, the system 100 includes a rectangular grid of antennas no.

The antennas 110 of the system 100 are preferably used both for transmission of signals to and reception of signals from RFID tags, but additionally or alternatively antennas may be used only for transmission or only for reception.

Figure 6:
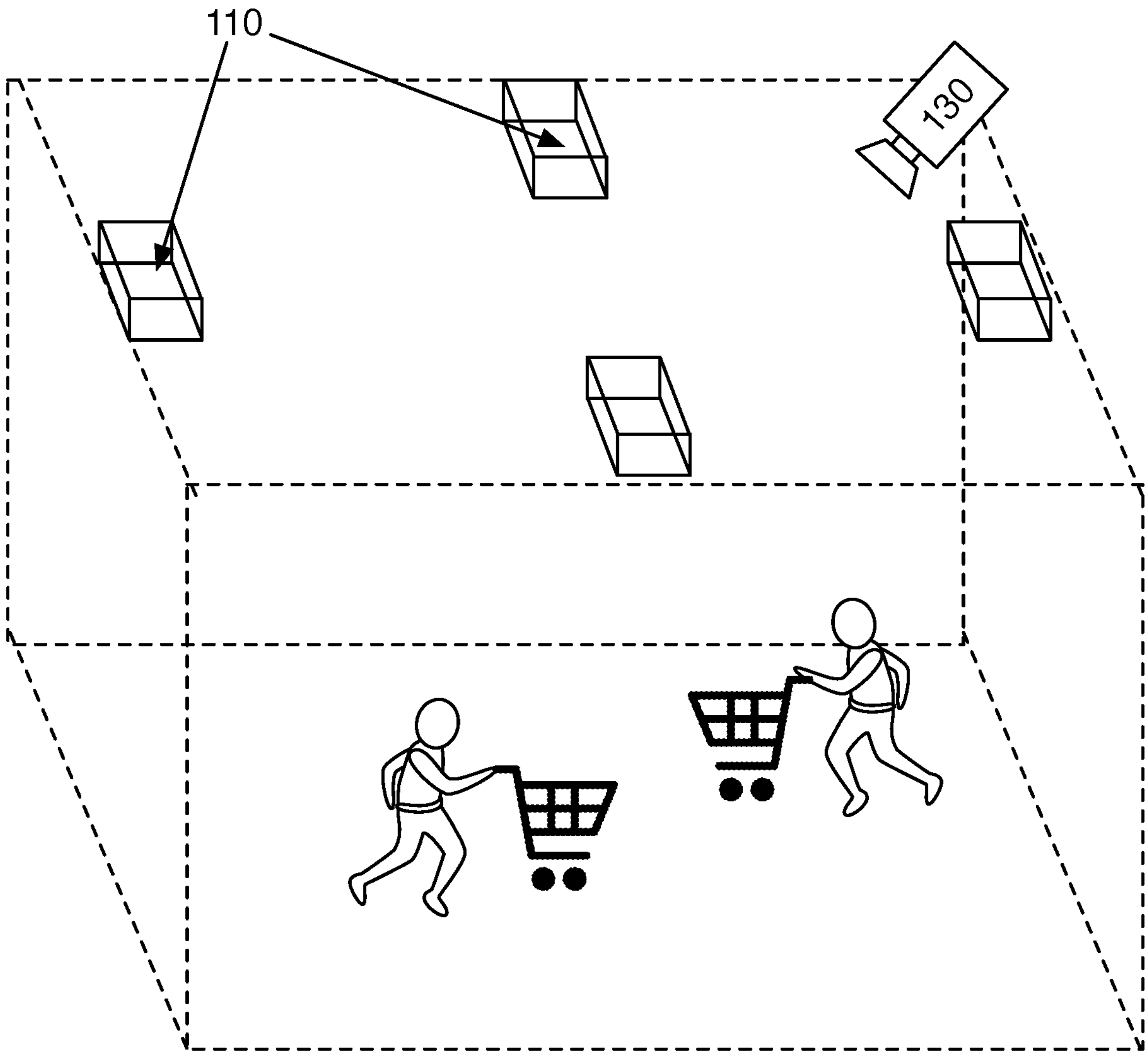
FIG. 6 is an isometric view of a system of a preferred embodiment.

Antennas 110 are preferably located as to provide coverage for a particular indoor area. For example, antennas 110 might be oriented in a rectangle on the ceiling of a store in order to locate RFID tags contained within a rectangular prism defined by the rectangle, as shown in FIG. 6. In this particular implementation, of the two solutions produced by trilateration, only one would be valid (the assumption being that no RFID tags are present above the ceiling).

The RFID transceiver 120 functions to produce signals for transmission by the antennas 110, as well as to analyze signals received by the antennas 110 from RFID tags. The RFID transceiver preferably includes an RF transmitter capable of sending signals in the 860-950 MHz range and an RF receiver capable of receiving signals in the 860-950 MHz range, but may additionally or alternatively be any suitable transceiver capable of communicating with RFID tags. The RFID transceiver 120 is preferably coupled directly to the antennas 110, but may additionally be coupled to the antennas 110 through an antenna splitter or through any other components.

The RFID transceiver 120 is preferably controlled by the system manager 140, but may additionally or alternatively be controlled by any other component of the system 100. The RFID transceiver 120 is preferably capable of modulating power to the antennas 110, additionally or alternatively, power modulation may be accomplished by a device external to the RFID transceiver 120 (e.g., an active splitter). The RFID transceiver 120 may also be capable of changing signal phase, frequency, beam-width, and other factors.

Visual Tracking

The system 100 preferably uses visual tracking to locate individuals and/or objects within a three-dimensional volume as a supplement to RFID tracking. The system 100 may additionally or alternatively use visual tracking independently of RFID tracking.

The system 100 preferably tracks objects and/or individuals by performing computer vision image recognition techniques (e.g., recognizing an image of an object as similar to a stored image, or as similar to store data describing the object). The system 100 may additionally or alternatively track objects and/or individuals using any other suitable techniques (e.g., motion analysis).

Visual tracking is preferably used by the system 100 to identify the presence and location of customers so that the areas around the customers may be scanned for RFID tags (to identify objects the customer is carrying or looking at). For this particular use, it may not be necessary to uniquely identify humans; it may instead be sufficient simply to identify humans generally. Visual tracking preferably locates customers using a three-dimensional tracking technique (e.g., stereo reconstruction, infrared depth tracking, etc.) but may additionally or alternatively locate customers in any suitable way (e.g., by checking 2D images for visual cues corresponding to location).

Visual tracking may additionally or alternatively be used to identify humans uniquely, using techniques such as facial recognition, gait analysis, and/or skeletal dimension analysis.

The camera 130 functions to provide a visual feed of an area (e.g., the main floor of a retail store) to the system 100 to be used for visual tracking. The camera 130 is preferably connected to the system manager 140, but may additionally or alternatively connect to any part of the system 100. The camera 130 preferably transmits video data to the system manager 140, but may additionally or alternatively transmit audio data, still picture data, depth data, or any other suitable data to the system manager 140.

The system 100 preferably includes a plurality of cameras to cover a region of interest; the cameras 130 may additionally or alternatively be placed at different angles covering the same region (e.g., to provide face recognition at multiple angles). Additionally or alternatively, cameras may be placed close together (e.g., to reconstruct three-dimensional data using stereo vision techniques).

The camera 130 is preferably a CMOS or CCD-based two-dimensional video camera, but may additionally or alternatively be a 3D camera (e.g., an assisted stereo camera or an RGB camera paired with a depth camera a la Microsoft's Kinect™).

The camera 130 is preferably used to locate and track persons. After a person has been located, the system 100 preferably defines a volume of interest around the person; i.e., a region of space that may contain objects that the person can interact with. This volume of interest may be defined by the size of the person (e.g., 150% of skeletal dimensions in x, y, and z directions), or alternatively may be static (e.g., a 2 m×2 m×2 m cube centered at an estimated center of mass of the person). The volume of interest may be of any shape and may be oriented in any respect with respect to the person (e.g., the volume of interest may extend in front of, but not behind, a person).

In a variation of a preferred embodiment, the camera 130 may also be used to track what areas of environment a person is looking at (by using head tracking, eye tracking, etc.). This information may be used to supplement the volume of interest, to define a second volume of interest (differentiating, say, objects a user may have in a shopping cart from objects a user is looking at on a shelf), or for any other suitable purpose.

Volumes of interest are preferably used to identify targeted volumes for RFID scanning. For instance, if a customer is walking out of a store, the volume around the customer may be scanned for RFID tags: this is both faster than scanning the entire store (or a larger region of the store), and reduces the chance of collisions in tag responses.

Volumes of interest may also be used for other purposes; for example, if an RFID tag of an object enters into a volume of interest (corresponding to a particular person) and then ceases to transmit, that person may be flagged for review by store security as a potential shoplifter.

In a variation of a preferred embodiment, the camera 130 may identify a region that persons are in instead of a volume of interest that directly corresponds to the persons' locations. For example, a store may be divided into 64 regions (A1, A2, . . . , H7, H8), and the camera 130 may be used to determine which region contains persons. This information may then be used in a suitable manner (e.g., scanning regions that contain persons more frequently).

The camera 130 may additionally or alternatively be used to identify persons uniquely, using techniques such as facial recognition, gait analysis, and/or skeletal dimension analysis. These techniques may be used to identify known customers, to differentiate between persons within a particular region, to aid in identifying shoplifters, or for any other suitable purpose.

System Management

The system manager 140 functions to control the output of the RFID transceiver 120, to process the signals received by the RFID transceiver 120, to analyze input from the camera 130, and to communicate with store systems (e.g., inventory, security, purchasing) to perform transactions and other functions based on RFID and camera data.

The system manager 140 includes a microprocessor; the system manager 140 may be integrated with the RFID transceiver 120, but may additionally or alternatively be separate of the RFID transceiver 120. The system manager 140 preferably also includes data storage, but may additionally or alternatively couple to external data storage solutions.

The system manager 140 enables the system 100 to transform RFID response data into a location for an RFID tag. The system manager 140 preferably accomplishes this using the read probability method previously described (and described in more detail in sections on the method 200), but may additionally or alternatively accomplish this using any suitable process.

The system manager 140 preferably controls the transmissions used for RFID tag location. The system manager 140 preferably adjusts phase and transmission power to locate RFID tags in a small number of iterations (e.g., by optimizing for a minimum number of iterations given rough knowledge about the position of a tag). For example, the system manager 140 may know from a previous search that a tag is located in a particular area. If analysis of historical data suggests that the tag is likely to be in the same area, the system manager 140 may attempt to isolate the search to this area before trying other areas. The system manager 140 storage may analyze historical data related to tag location in a number of ways. Historical data preferably includes historical environmental data, historical absolute location data (e.g., the tag's location in coordinate space), historical relative location data (e.g., the tag's location relative to other tags or other references), behavioral data (e.g., the tag is likely to be in the middle of the area during the afternoon, but near the left edge during the evening), or any other suitable data.

The system manager 140 preferably alters phase and transmission power of antennas 110 by controlling RF transceivers 120, but may additionally or alternatively alter antenna phase and transmission power in any suitable manner.

The system manager 140 preferably also enables the system 100 to transform camera 130 input data into object and/or person identifications and locations using computer vision techniques. If cameras 130 include controls (e.g., pan, zoom, tilt, etc.), the system manager 140 preferably additionally controls the cameras 130 to aid in object/person identification and location.

The system manager 140 is preferably coupled to or includes systems designed to process object/person location information; for example, the system manager 140 may be coupled to an inventory database, a purchasing system, and a store security system. The system manager 140 may communicate with these systems in any suitable manner.

For example, the system manager 140 may track the locations of all objects in a store (using RFID tags coupled to the objects). The number of objects, their RFID identifiers, and their locations may be stored in the inventory database, allowing customers and/or store employees to easily locate merchandise.

The system manager 140 may also track the location of customer cards (i.e., cards containing an RFID tag that are linked to customer purchasing accounts). The system manager may track inventory items within a certain radius of a customer (or within an area linked to a customer; for example, a shopping cart) and assign those items to the customer. When a customer leaves a store, the items the customer leaves with may be passed from the system manager, along with the customer card ID, to a purchasing system to process the transaction.

Similarly, a user without an identified customer card (or with a customer card not linked to a valid payment method, etc.) may be stopped from leaving the store: the system manager 140 may identify that a person not authorized to leave with items is doing so, and pass the location of the person to a store security system. The system manager 140 or store security system may trigger an alarm, bar egress, or take other appropriate actions to further identify and deter shoplifting.

Systems and methods for automatically checking out customers are described in the co-pending U.S. patent application Ser. No. 13/651,297, which is hereby incorporated by reference in its entirety.

2. Method for RFID-Based Retail Management

Figure 7:
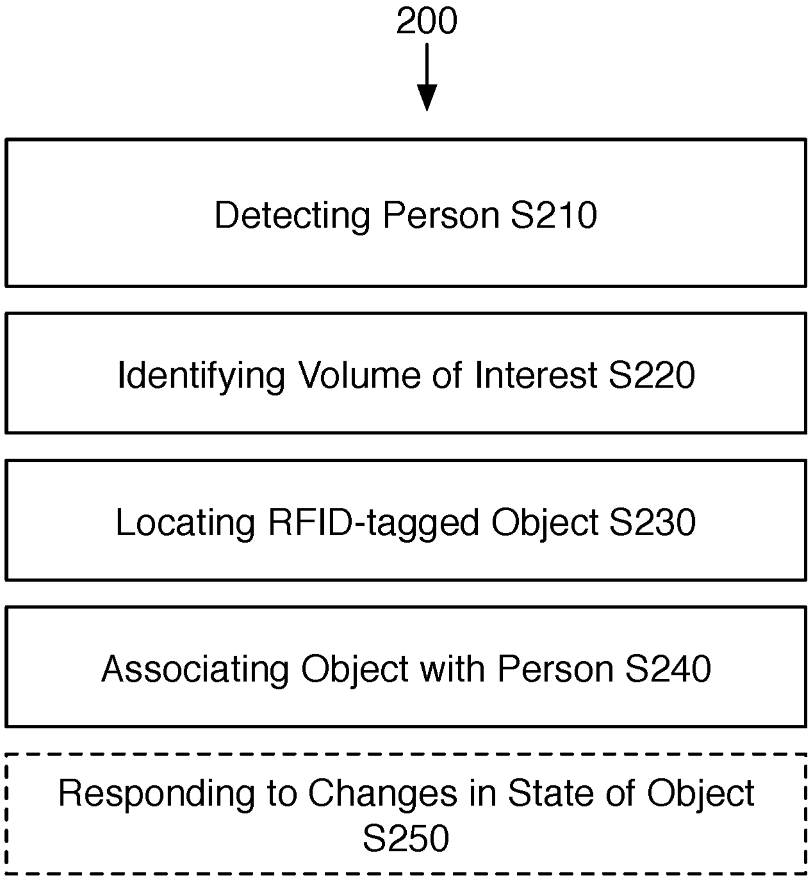
FIG. 7 is a chart representation of a method of a preferred embodiment.

As shown in FIG. 7, a method 200 for RFID-based retail management includes detecting a person present in a monitored region S210, identifying a volume of interest corresponding to the person S220, locating an RFID-tagged object within the volume of interest S230, and associating the RFID-tagged object with the person S240. The method 200 may additionally include responding to changes in state of the RFID-tagged object S250.

The method 200 functions to enable inventory management in a retail environment by tracking individuals throughout the environment, locating objects within the vicinity of each individual and associating those objects with said individual, and responding to changes in state of those objects (e.g., tracking changed location, allowing for purchase of objects, identifying stolen objects, etc.). This method of inventory management may reap benefits including smart inventory management, high-efficiency, low-cost security, and/or automated check-out:

- If an object is moved, the location of the object can automatically be updated in a store inventory database;
- If an unauthorized person attempts to remove an object, a security system can raise an alarm or prevent egress; and
- If a known customer removes an object from the store, the price of the object can be automatically debited from the customer's account, eliminating the need for traditional checkout.

The method 200 is preferably implemented by the system 100, but may additionally or alternatively be implemented by any suitable RFID tracking system.

Step S210 includes detecting a person present in a monitored region. Step S210 functions to locate persons within some monitored area or region (e.g., the consumer-accessible areas of a retail store monitored by RFID antennas and/or cameras) using either or both of RFID tracking and visual tracking. After persons have been located, objects that the person is carrying or otherwise associated with may be identified.

Step S210 preferably includes locating a person within the monitored region, but may additionally or alternatively simply detect the presence of a person without attempting to calculate the person's location within a region.

Figure 8:
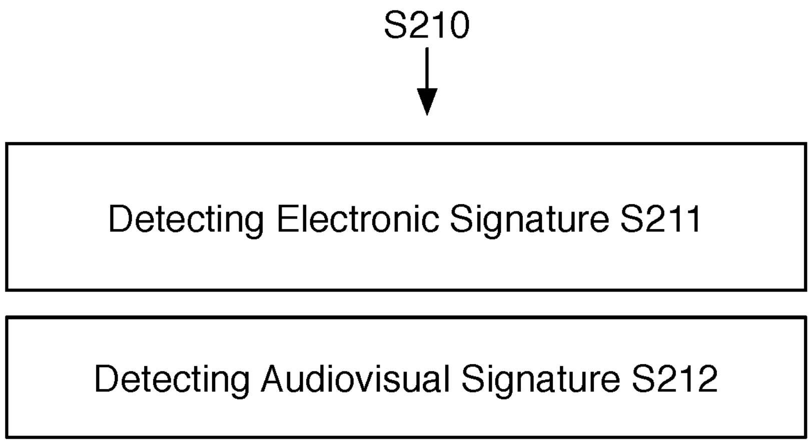
FIG. 8 is a chart representation of a step of a method of a preferred embodiment.

As shown in FIG. 8, Step S210 preferably includes at least one of detecting an electronic signature S211 and detecting an audiovisual signature S212.

Detecting an electronic signature S211 functions to detect a person within a monitored region by detecting electronic emissions associated with the person. Step S211 preferably includes detecting an RFID tag associated with a person; for example, this RFID tag may be integrated into a customer ID card (or store credit card). Step S211 may additionally or alternatively include detecting other types of electronic signatures (e.g., detecting the presence of a person by characteristic radiation given off by a cell phone).

Step S211 may additionally or alternatively include locating a person within the monitored region based on the electronic signature. The method for locating a person of Step S211 is preferably substantially similar to the locating methods of Step S23*o*, but may additionally or alternatively be any suitable method (e.g., RSSI trilateration, etc.).

Detecting an audiovisual signature S212 functions to detect a person within a monitored region by detecting audio and/or visual signals associated with the person. Step S211 preferably includes detecting a person using computer vision image recognition techniques performed on a video camera feed, but may additionally or alternatively include detecting a person using any suitable automated image or audio recognition techniques (e.g., gait detection, detecting a person based on speech captured by a microphone).

Step S212 may additionally or alternatively include locating a person within the monitored region based on the audiovisual signature. Step S212 preferably includes locating the person a three-dimensional tracking technique (e.g., stereo reconstruction, infrared depth tracking, etc.) but may additionally or alternatively include locate the person in any suitable way (e.g., by checking 2D images for visual cues corresponding to location).

In a variation of a preferred embodiment, Step S210 may include identifying a person uniquely (by electronic signature, audiovisual signature, or any other suitable method). For example, if a person is detected by the electronic signature of an RFID tag, the tag's ID number may be uniquely linked to a person in a store database. As another example, if a person is detected by audiovisual signature, techniques such as facial recognition, gait analysis, speech analysis, and/or skeletal dimension analysis may be used to identify the person.

Step S210 may use any combination of electronic and audiovisual signatures to locate and/or identify a person. For example, Step S210 may use image recognition to detect and locate a person, and then RFID scan the volume around the person to identify the person according to the electronic signature of an RFID tag in the user's pocket.

Step S220 includes identifying a volume of interest corresponding to the person. Step S220 functions to define a region of space that may contain objects that the person can interact with (e.g., objects in a person's shopping cart). This volume of interest may be defined by the size of the person (e.g., 150% of skeletal dimensions in x, y, and z directions), or alternatively may be static (e.g., a 2 m×2 m×2 m cube centered at an estimated center of mass of the person). The volume of interest may be of any shape and may be oriented in any respect with respect to the person (e.g., the volume of interest may extend in front of, but not behind, a person).

In a variation of a preferred embodiment, a volume of interest may correspond to multiple people. For instance, a volume of interest may defined by a person's location within a set of zones; that is, if a person is located within a particular zone, the volume of interest may be defined by the zone. In this case, if multiple persons are within a zone, they may all be associated with the same volume of interest.

Step S220 may include identifying more than one volume of interest for a person; for example, Step S220 may include identifying a "shopping cart" volume (a volume containing objects the person has selected for purchase) and a "browsing" volume (a volume containing objects that the person is looking at, but has not selected for purchase; e.g., a volume beyond arms length encompassing items in a person's field of vision.)

Volumes of interest are preferably used to identify targeted volumes for RFID scanning. For instance, if a customer is walking out of a store, the volume around the customer may be scanned for RFID tags: this is both faster than scanning the entire store (or a larger region of the store), and reduces the chance of collisions in tag responses. Volumes of interest may also be used for other purposes; for example, if an RFID tag of an object enters into a volume of interest (corresponding to a particular person) and then ceases to transmit, that person may be flagged for review by store security as a potential shoplifter.

Step S230 includes locating an RFID-tagged object within the volume of interest. Step S230 functions to find RFID-tagged objects within the vicinity of a person (e.g., to identify objects the person has picked up and/or intends to purchase). Step S230 preferably includes locating an RFID-tagged object using read probability techniques.

Figure 9:
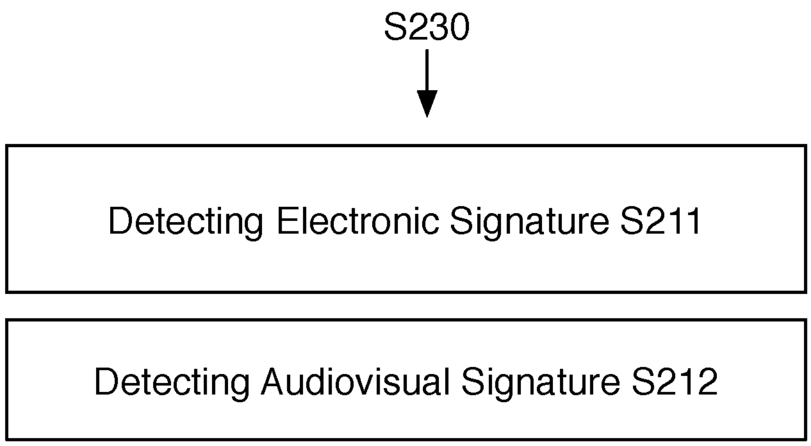
FIG. 9 is a chart representation of a step of a method of a preferred embodiment.

As shown in FIG. 9, Step S230 preferably includes transmitting a plurality of RFID activation signals from separate antennas S231, receiving response signals from RFID tags S233, and locating RFID tags based on the response signals S234. Step S230 may additionally include modifying transmission signal properties S232.

Figure 10:
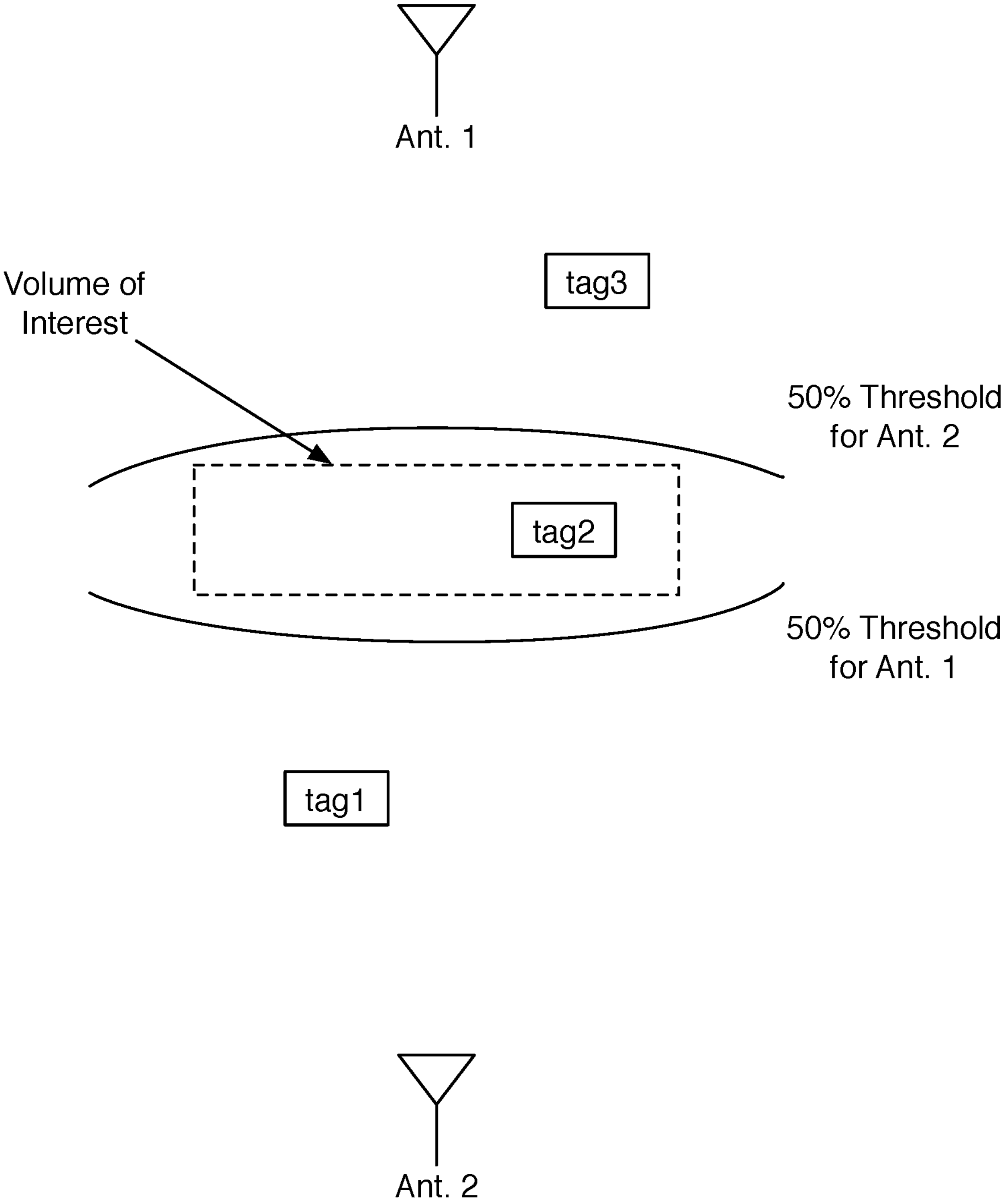
FIG. 10 is an example representation of localization of tags within a volume of interest.

A two-dimensional example of this process is as shown in FIG. 10. Antenna 1 sends ten signals out, each with a transmission power such that the fifty-percent threshold of the signal (i.e., the contour at which an RFID tag is activated approximately fifty percent of the time) is just past the volume of interest. Antenna 2 also sends ten signals out, also with the fifty-percent threshold of Antenna 2'S signals located just past the other side of the volume of interest. Out of the ten signals from Antenna 1, tag 1 activates twice, tag 2 activates six times, and tag 3 activates eight times. Out of the ten signals from Antenna 2, tag 1 activates seven times, tag 2 activates five times, and tag 3 activates just once. Given that tag 1 activates only twice for Antenna 1's signals, it is extremely unlikely that it is between Antenna 1 and Antenna 1's fifty-percent threshold. Likewise, given that tag 3 activates only once for Antenna 2'S signals, it is extremely unlikely that it is between Antenna 2 and Antenna 2'S fifty-percent threshold. Tag 2, on the other hand, has reasonable response rates for both antennas (close to the expected value of five), and so it is reasonably likely that tag 2 is within the volume of interest.

As can be seen by extrapolating this example, the accuracy of this method can be increased by increasing the number of antennas and the number of distinct signals sent (i.e., number of signals that have distinct power or other transmission properties) as well as the number of repeat signals sent (i.e., number of signals that are identical).

Step S231 includes transmitting a plurality of RFID activation signals from separate antennas. Step S231 functions to activate RFID tags within an area defined by the transmitting antenna range. Signals transmitted in Step S231 may be characterized in a number of ways, including by antenna radiation pattern, antenna orientation, antenna type, transmission power, frequency, phase, beam-width, and other factors.

The locations of the antennas are preferably known relative to each other; antennas may additionally or alternatively be referenced to any coordinate frame of reference.

The transmission power of activation signals are preferably set based on estimated read probability thresholds, but may additionally or alternatively be based on any suitable instructions or data.

The particular power settings chosen for each signal are preferably informed by historical data; that is, signals generated by Step S231 are preferably intended to primarily activate tags in a particular subset of in-range area where the tags are assumed to be (e.g., in a volume of interest). Additionally or alternatively, the power and phase settings chosen by Step S231 may result from explicit settings (e.g., the first activation signals always have a relative phase of zero and a transmission power of 100 dBm), other data (e.g., data from other locating methods), or any other suitable instructions.

Step S231 may additionally or alternatively include receiving environmental data (e.g., humidity, presence of people or objects, temperature, etc.) or previous mapping information (e.g., a mapping of particular transmission settings to a read probability threshold). This data may be used to inform the transmission settings.

Step S232 includes altering transmission signal properties. Step S232 functions to change the transmission signals used to enable RFID tag responses. Step S232 may be used to increase the accuracy of read probability results, especially in cases where read probability threshold changes rapidly with distance. In this case, it may take multiple scans at different power levels to accurately locate an RFID-tagged object.

Step S232 preferably includes altering one or more of antenna radiation pattern, antenna orientation, signal transmission power, frequency, phase, and beam-width in order to alter transmission signal properties.

The alterations made by Step S232 preferably are informed by existing data or estimates pertaining to an RFID tag's location; additionally or alternatively, alterations may be made according to a static instruction set or in any other suitable manner. For example, if analysis of data from Step S232 identifies an RFID tag as occupying a location in the first quadrant of a square area (i.e., $x>0$ and $y>0$) or in the third quadrant ($x<0$, $y<0$), and historical data suggests that the RFID tag is much more likely to be in the first quadrant, the alterations made by Step S232 may result in read probability measurements that are more likely to provide detailed location information on a tag located in the first quadrant.

Step S233 includes receiving response signals from RFID tags. Step S233 functions to provide data that can be used to generate information about the RFID tag's location. Based on the transmission settings of Step S231 and the predicted mapping of read probabilities, the location of the RFID tag may be confined to a set of small areas. Note that Step 231 may need to be iterated multiple times at different transmission settings before receiving enough response signals from a particular RFID tag to accurately locate the tag.

Step S233 preferably includes receiving an analog signal over one or more antennas; these antennas are preferably the same antennas used to transmit signal in Step S231, but may additionally or alternatively be any suitable antennas. This analog signal is preferably converted to a digital signal and analyzed to provide the locating system with the RFID tag ID. Additionally or alternatively, if the tag identifier is not important to a particular application, the signal may not be converted (e.g., an application that only cares about locating any tag, not a specific tag).

Step S234 includes locating RFID tags based on the response signals. Step S234 functions to determine or estimate where RFID tags are located based on responses to transmitted signals.

Step S234 preferably calculates RFID tag position by correlating RFID tag response or non-response to various signals at various powers to locations defined by read probability mappings. Step S234 preferably produces RFID tag position data from RFID tag response data and transmission parameter sets (e.g., whether a tag responded or not for a particular transmission parameter set) by generating a read probability mapping estimate (or other distribution correlated to RFID response rates) based on the transmission parameter set.

The mapping between transmission parameter sets and read probability mapping estimates is preferably static, but may additionally or alternatively be calibrated or adapted as part of the method 200. The read probability mapping may vary solely on transmission power and phase (i.e., all other transmission parameters, including antenna location, and environmental variables are considered static) or the mapping may vary based on additional variables. For example, the mapping might also vary based on the number of people (and their locations) known to be in a particular area (changing the permittivity of the area, and thus the read probability) or based on antenna direction, if antenna direction is variable. In some cases, permittivity may be estimated by locating persons using a three-dimensional camera, calculating their volumes, and accounting for permittivity changes within those volumes.

Step S234 may additionally or alternatively include calculating RFID tag position based on a combination of multiple locating methods (e.g., by locating an RFID tag to a particular area using RSSI trilateration and then locating the tag within that area using read probability methods).

Step S240 includes associating the RFID-tagged object with the person. Step S240 preferably links object identifiers (e.g., RFID ID number) to personal identifiers (e.g., RFID customer card ID number, name, credit card number, facial image, etc.) based on their colocation. Step S240 preferably associates RFID-tagged objects with the person by identifying the object as within a volume of interest associated with the person (e.g., within a foot of a person) and then storing or otherwise maintaining information linking the person to the object.

If Step S240 identifies an object in two distinct volumes of interest associated with different persons, Step S240 may include requesting further location information. If further location information does not resolve the conflict, Step S240 may include waiting for the conflict to be resolved (e.g., waiting for the two people's volumes of interest to no longer intersect).

Step S240 preferably includes associating the RFID-tagged object with the person by modifying an inventory database, but may additionally or alternatively include associating RFID-tagged object with the person in any other suitable manner.

Step S250 includes responding to changes in state of the RFID-tagged object. Step S250 functions to monitor RFID-tagged object and trigger actions in response to certain events.

Figure 11:
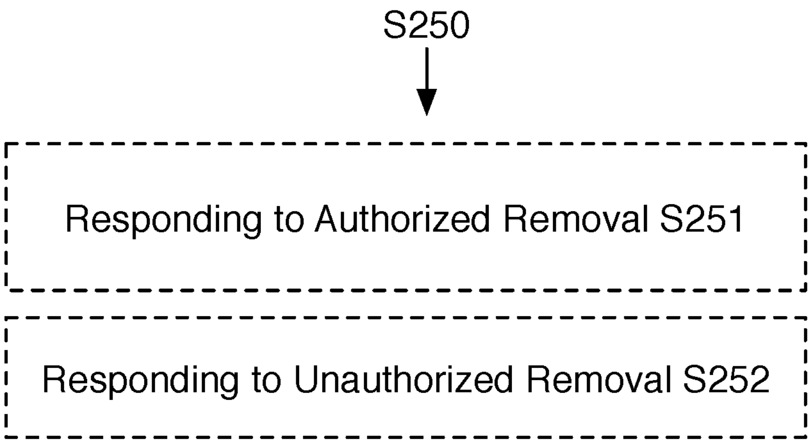
FIG. 11 is a chart representation of a step of a method of a preferred embodiment.

As shown in FIG. 11, Step S250 may include responding to authorized removal of the RFID-tagged object S251 and/or responding to unauthorized removal of the RFID-tagged object S252.

Step S251 preferably includes responding to authorized removal of the RFID-tagged object (e.g., a known customer leaving a store with an item) by updating an inventory database linked with store systems. Step S251 may additionally or alternatively include processing payment for the RFID-tagged object using a purchasing system. Step S251 may additionally or alternatively include responding to authorized removal of an RFID-tagged object in any suitable manner (e.g., updating an inventory database to include an identifier for the person who removed the RFID-tagged object).

Step S252 preferably includes responding to unauthorized removal of the RFID-tagged object (e.g., by a customer without an identified customer card or with a customer card not linked to a valid payment method, etc.). Step S252 may include stopping such a person from leaving the store: Step S252 may include identifying that a person not authorized to leave with items is doing so, and passing the location of the person to a store security system. Step S252 may additionally or alternatively include triggering an alarm, barring egress, or taking other appropriate actions to further identify and deter shoplifting.

While the examples in this application are primarily directed to use of the system 100 and the method 200 in retail environments, a person skilled in the art will recognize that the system 100 and method 200 may find use not only in retail environments, but also in manufacturing, warehousing, retail inventory management, and medicine, to name a few areas.

The methods of the preferred embodiment and variations thereof can be embodied and/or implemented at least in part as a machine configured to receive a computer-readable medium storing computer-readable instructions. The instructions are preferably executed by computer-executable components preferably integrated with an RFID tag locating system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method of locating a radio-frequency identification (RFID) tag, the method comprising:

determining, from historical data, a previous location of the RFID tag relative to other RFID tags;

transmitting, from a plurality of antennas, activation signals toward the RFID tag, wherein transmitting the activation signals comprises isolating transmission of the activation signals to a region containing the previous location of the RFID tag;

receiving, by the plurality of antennas, responses to the activation signals from the RFID tag;

determining, by a processor operably coupled to the plurality of antennas, possible solutions for a location of the RFID tag based on the responses to the activation signals; and determining, by the processor, that one of the possible solutions for the location of the RFID tag is a valid solution based on an assumption about a location of the RFID tag.

2. The method of claim 1, wherein the plurality of antennas comprises patch antennas.

3. The method of claim 1, wherein transmitting the activation signals from the plurality of antennas comprises transmitting the activation signals at different power levels and/or phases.

4. The method of claim 1, wherein transmitting the activation signals from the plurality of antennas comprises steering the activation signals.

5. The method of claim 1, wherein the plurality of antennas is oriented in a rectangle on a ceiling, the RFID tag is contained within a rectangular prism defined by the rectangle, and that the valid solution is within the rectangular prism.

6. The method of claim 1, wherein determining that one of the possible solutions for the location of the RFID tag is a valid solution comprises eliminating a possible solution that places the location of the RFID tag above a ceiling.

7. The method of claim 1, wherein the historical data comprises behavioral data indicating a likely position of the RFID tag based on a time of day.

8. The method of claim 1, further comprising:

mapping the valid solution for the location of the RFID tag to transmission settings for the activation signals.

9. The method of claim 8, further comprising:

using the mapping of the valid solution for the location of the RFID tag to transmission settings for the activation signals to determine a location of another RFID tag.

10. A system for locating a radio-frequency identification (RFID) tag, the system comprising:

a plurality of antennas configured to transmit activation signals toward the RFID tag and to receive responses to the activation signals from the RFID tag; and a processor operably coupled to the plurality of antennas and configured to estimate possible solutions for a location of the RFID tag based on the responses to the activation signals and determine that one of the possible solutions for the location of the RFID tag is a valid solution based on an assumption about a location of the RFID tag, wherein the processor is further configured to determine, from historical data, a previous location of the RFID tag relative to other RFID tags and the plurality of antennas is configured to isolate transmission of the activation signals to a volume containing the previous location of the RFID tag.

11. The system of claim 10, wherein the plurality of antennas comprises patch antennas.

12. The system of claim 10, further comprising:

a transceiver operably coupled to the plurality of antennas and configured to modulate a power level and/or a phase of the activation signals transmitted by the plurality of antennas.

13. The system of claim 10, wherein the plurality of antennas is configured to steer the activation signals.

14. The system of claim 10, wherein the plurality of antennas is oriented in a rectangle on a ceiling, the RFID tag is contained within a rectangular prism defined by the rectangle, and that the valid solution is within the rectangular prism.

15. The system of claim 10, wherein the processor is configured to determine that one of the possible solutions for the location of the RFID tag is a valid solution by eliminating a possible solution that places the location of the RFID tag above a ceiling.

16. A method of locating a radio-frequency identification (RFID) tag, the method comprising:

determining, by a processor, a previous location of the RFID tag relative to other RFID tags based on historical data;

determining a volume of interest based on the previous location of the RFID tag relative to the other RFID tags;

scanning, by a plurality of antennas operably coupled to the processor and mounted from a ceiling, activation signals with powers and/or phases selected based on the volume of interest across the volume of interest;

receiving, by the plurality of antennas, responses to the activation signals from the RFID tag;

determining, by the processor, possible solutions for a location of the RFID tag based on the responses to the activation signals; and determining, by the processor, that one of the possible solutions for the location of the RFID tag is an invalid solution based at least in part on an assumption about a location of the RFID tag with respect to the ceiling.

* * * * *